United States Patent [19]

Hoover et al.

[11] Patent Number: 4,984,368
[45] Date of Patent: Jan. 15, 1991

[54] LIFE CUT

[76] Inventors: James R. Hoover, 5154 Dream Ct., Sacramento, Calif. 95842; George Spector, 233 Broadway #3815, New York, N.Y. 10007

[21] Appl. No.: 391,023
[22] Filed: Aug. 9, 1989
[51] Int. Cl.⁵ .............................................. B26B 13/00
[52] U.S. Cl. ........................................ 30/231; 30/151; 30/254; 190/271; 206/349; 280/801
[58] Field of Search ................. 30/151, 155, 231, 254, 30/257; 180/268, 271; 280/801; 297/482; 206/349

[56] References Cited

U.S. PATENT DOCUMENTS 187,401  2/1877  McMarlin .............................. 30/231
4,048,721  9/1977  Gunson ................................. 30/254

OTHER PUBLICATIONS

Fruit Clipper, ECEF SpA Milano, Italy, May 1969.

Primary Examiner—Douglas D. Watts

[57] ABSTRACT

An emergency scissors for cutting through a jammed seat belt of a motor vehicle is provided in which the blades are blunt tipped to avoid injury to the eyes. The emergency scissors can be carried in a storage sheath that is attached to a dashboard of the motor vehicle. The emergency scissors can also be connected by an L-shaped bracket to a seat belt buckle and be in position to immediately cut through the jammed seat belt after a collision.

2 Claims, 1 Drawing Sheet

U.S. Patent  Jan. 15, 1991  4,984,368
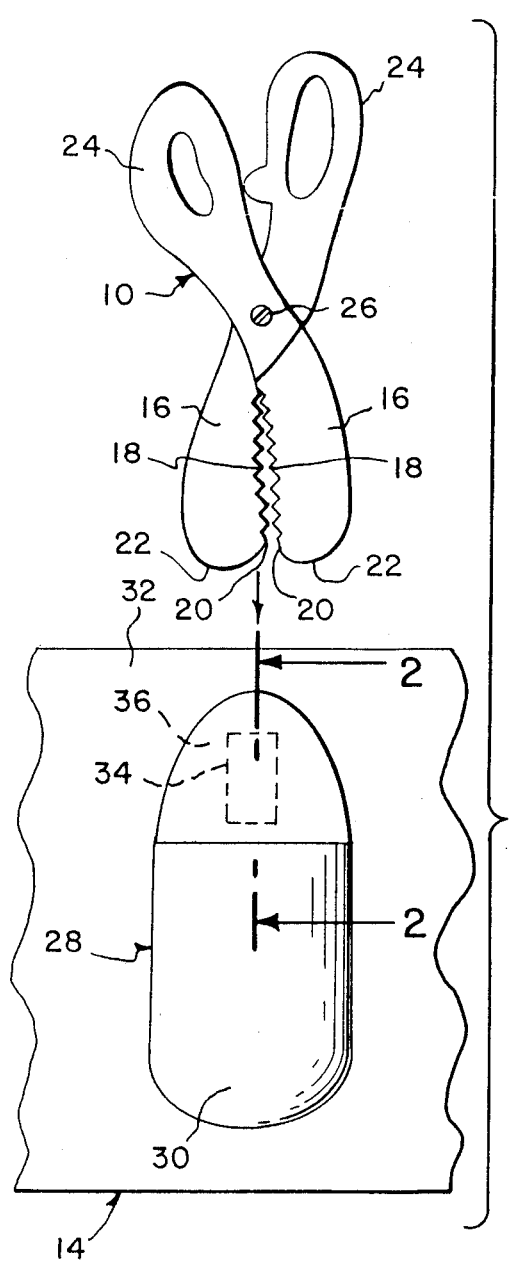
Fig. 1
Fig. 2
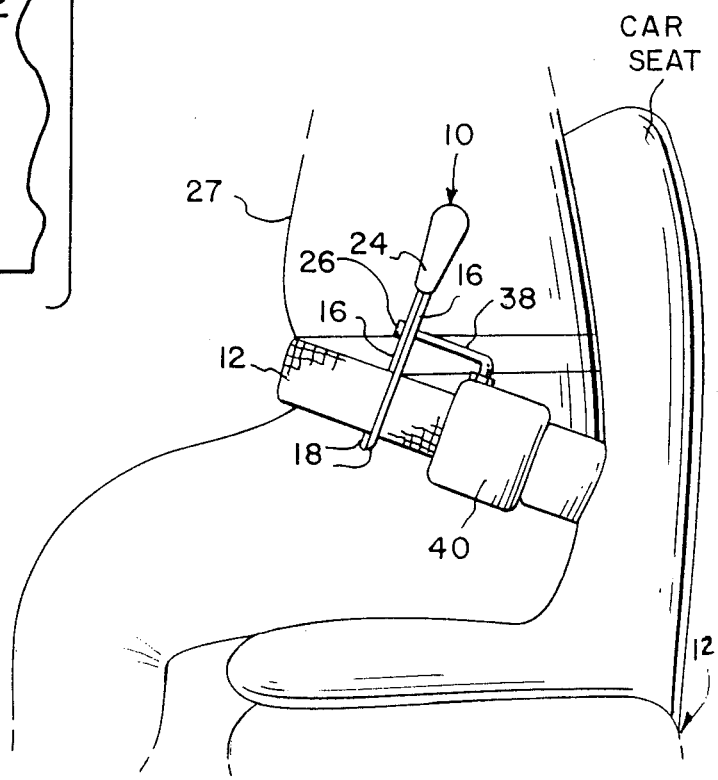
Fig. 3

LIFE CUT

BACKGROUND OF THE INVENTION

The instant invention relates generally to cutlery and more specifically it relates to an emergency scissors for cutting through a jammed seat belt of a motor vehicle.

Numerous cutlery have been provided in prior art that are adapted to be used to cut through various thin materials such as paper, cardboard, plastic, etc. For example, U.S. Pat. No. 290,808 to Linden is illustrative of such prior art. While this unit may be suitable for the particular purpose to which it addresses, it would not be as suitable for the purposes of the present invention as heretofore described.

SUMMARY OF THE INVENTION

A primary object of the present invention is to provide an emergency scissors for cutting through a jammed seat belt of a motor vehicle that will overcome the shortcomings of the prior art devices.

Another object is to provide an emergency scissors for cutting through a jammed seat belt of a motor vehicle due to a collision in which the emergency scissors is blunt tipped to avoid injury to eyes and is carried in a storage sheath that is attached to dashboard of the motor vehicle by VELCRO fasteners.

An additional object is to provide an emergency scissors for cutting through a jammed seat belt of a motor vehicle in which the emergency scissors is directly connected to a seat belt buckle so as to be in position to immediately cut through the jammed seat belt.

A further object is to provide an emergency scissors for cutting through a jammed seat belt of a motor vehicle that is simple and easy to use.

A still further object is to provide an emergency scissors for cutting through a jammed seat belt of a motor vehicle that is economical in cost of manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front elevational view of the invention being an emergency scissors with blunt tipped blades pulled out of a sheath that is attached to a motor vehicle dashboard by a hook and loop pile fastener strips so that the emergency scissors can be used to cut through a jammed seat belt after an accident.

FIG. 2 is a cross sectional view taken along line 2—2 in FIG. 1 showing the hook and loop pile fastener strips in greater detail.

FIG. 3 is a side view of a modification in which the emergency scissors is directly attached to a seat belt buckle and is positioned to cut through the jammed seat belt.

DETAILED DESCRIPTION OF THE PREFERRED EMBODIMENTS

Turning now descriptively to the drawings, in which similar reference characters denote similar elements throughout the several views, FIGS. 1 and 3 illustrate an emergency scissors 10 for cutting through a jammed seat belt 12 of a motor vehicle 14 consisting of a pair of blades 16, each having teeth 18 along a cutting edge 20, and a blunt tip 22 to avoid injury to the eyes. A pair of handles 24 are also provided, in which each are disposed on one of the blades 16 opposite the blunt tip 22. A swivel pivot pin 26 joins the pair of blades 16 together so that a person 27 can grip the handles 24 to open and close the blades 16 so that the teeth 18 along the cutting edges 20 can cut through the jammed seat belt 12.

The blades 16 Could be made of hardened stainless steel. Modern cutlery is commonly made from stainless steel containing twelve to sixteen percent chromium, which makes the metal corrosion resistant. The carbon content of the steel ranges from a minimum of 0.2 percent to 0.5 percent. The carbon give the steel the hardenability necessary for heat treatment.

Nickel is a very common alloying element, for example, adding qualities of hardness, yet toughness and strength. A small amount of molybdenum can also be alloyed to improve creep and wear resistance. This would also improve the shock resistance of the emergency scissors 10, an important quality for any precision measuring instrument. Such emergency scissors are also typically heat-treated for extra strength, then oil-quenched and tempered for core hardening to eliminate interior soft spots. A heavy nickel or nickel-chrome or satin chrome finish is also commonly applied to such emergency scissors 10 to improve overall durability, maintain the precision of the instrument and to resist rust and corrosion.

The blades 16 could be produced through forging. Forging is generally specified when maximum strength and reliability are required. Forging is the only basic method of fabrication that improves the metal. Other advantages of forging include minimal waste of metal, fine textured finishes, short machining time, minimal need of tools, consistent grain structure, lack of porosity or other concealed flaws, and ability to produce irregular shapes or complicated parts.

In the process of forging, heated metal is worked into shape through pressure, usually with the hammering action of a mechanically operated press. Forging offers the best method for strengthening steel, brass, aluminum and other metals. In addition to hot forging, much forging is now being done by applying tremendous pressure to cold metal, causing it to flow into the desired shape.

The handles 24 could be produced from a tough, high-impact plastic such as ABS. ABS is a plastic material that is being increasingly used in manufacturing because of its excellent qualities. It possesses good resistance to chemicals, including cleaning agents, toughness, impact strength, dimensional stability, rigidity, surface appearance, colorability, and is easily processed in most of the common methods of the plastics industry. The constituent monomers of ABS can be formulated in any proportions to produce a plastic material with specific properties for any application.

The handles 24 would be injection molded onto the blades 16. In this process, a granulated plastic resin is placed in a hopper and then is pumped into a heating chamber with the stroke of a plunger. After the material has melted, it is forced into a cooled mold that is closed under pressure. Once the mold has been filled, the material hardens quickly. The mold is then opened and the hardened piece is forced out by ejection pins. By using multiple cavity molds, several pieces can be formed in a single cycle, making this process quite suitable for efficient, high-volume production.

FIGS. 1 and 2 show a sheath 28 having a pouch 30 for storing the blades 16 when the emergency scissors 10 is not being used. The sheath 28 is attached to an interior surface 32, such as on a dashboard of a motor vehicle 14, so that the person 27 has access to the handles 24 of the emergency scissors 10. Hook and loop pile fastener strips 34 are used in which one of the strips is attached to rear 36 of the sheath 28 and other of the strips is attached to the interior surface 32 of the motor vehicle 14.

FIG. 3 shows an L-shaped bracket 38 attached from the swivel pivot pin 26 to a seat belt buckle 40 with the blades 16 directly in position between the jammed seat belt 12 so that the person 27 can immediately operate the emergency scissors 10 to cut therethrough.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An emergency scissors for cutting through a jammed seat belt of a motor vehicle which comprises:
   (a) a pair of blades, each having teeth along a cutting edge and a blunt tip to avoid injury to the eyes;
   (b) a pair of handles, each disposed on one of said blades opposite said blunt tip; and
   (c) a swivel pivot pin joining said pair of blades together so that a person can grip said handles to open and close said blades so that said teeth along said cutting edges can cut through the jammed seat belt; wherein
   (d) said blades are fabricated out of hardened stainless steel;
   (e) said handles are fabricated out of tough, high-impact plastic; further including
   (f) a sheath having a pouch for storing said blades when said emergency scissors are not being used, and
   (g) means for attaching said sheath to an interior surface of the motor vehicle so that the person has access to said handles of said emergency scissors; wherein said attaching means includes hook and loop pile fastener strips in which one of said strips is attached to rear of said sheath and other of said strips is attached to the interior surface of the motor vehicle.

2. An emergency scissors for cutting through a jammed seat belt of a motor vehicle which comprises:
   (a) a pair of blades, each having teeth along a cutting edge and a blunt tip to avoid injury to the eyes;
   (b) a pair of handles, each disposed on one of said blades opposite said blunt tip; and
   (c) a swivel pivot pin joining said pair of blades together so that a person can grip said handles to open and close said blades so that said teeth along said cutting edges can cut through the jammed seat belt, wherein
   (d) said blades are fabricated out of hardened stainless steel;
   (e) said handles are fabricated out of tough, high-impact plastic, further including an L-shaped bracket attached from said swivel pivot pin to a seat belt buckle with said blades directly in position between the jammed seat belt so that the person can immediately operate said emergency scissors to cut therethrough.

* * * * *